Aug. 29, 1939.  H. WOCHNER  2,171,283
BRAKE TESTING APPARATUS FOR MOTOR VEHICLES
Filed Aug. 12, 1936  5 Sheets-Sheet 4
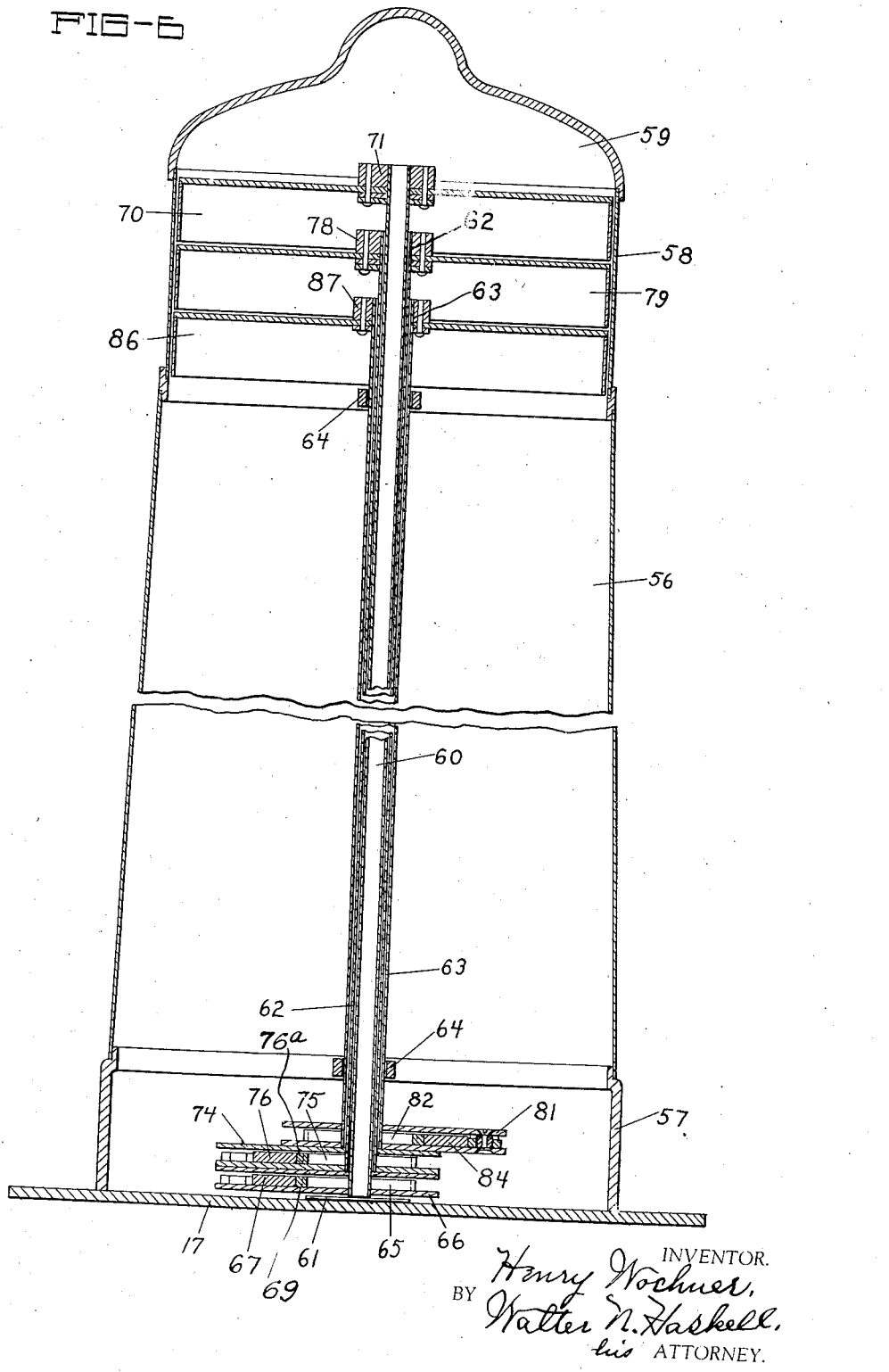

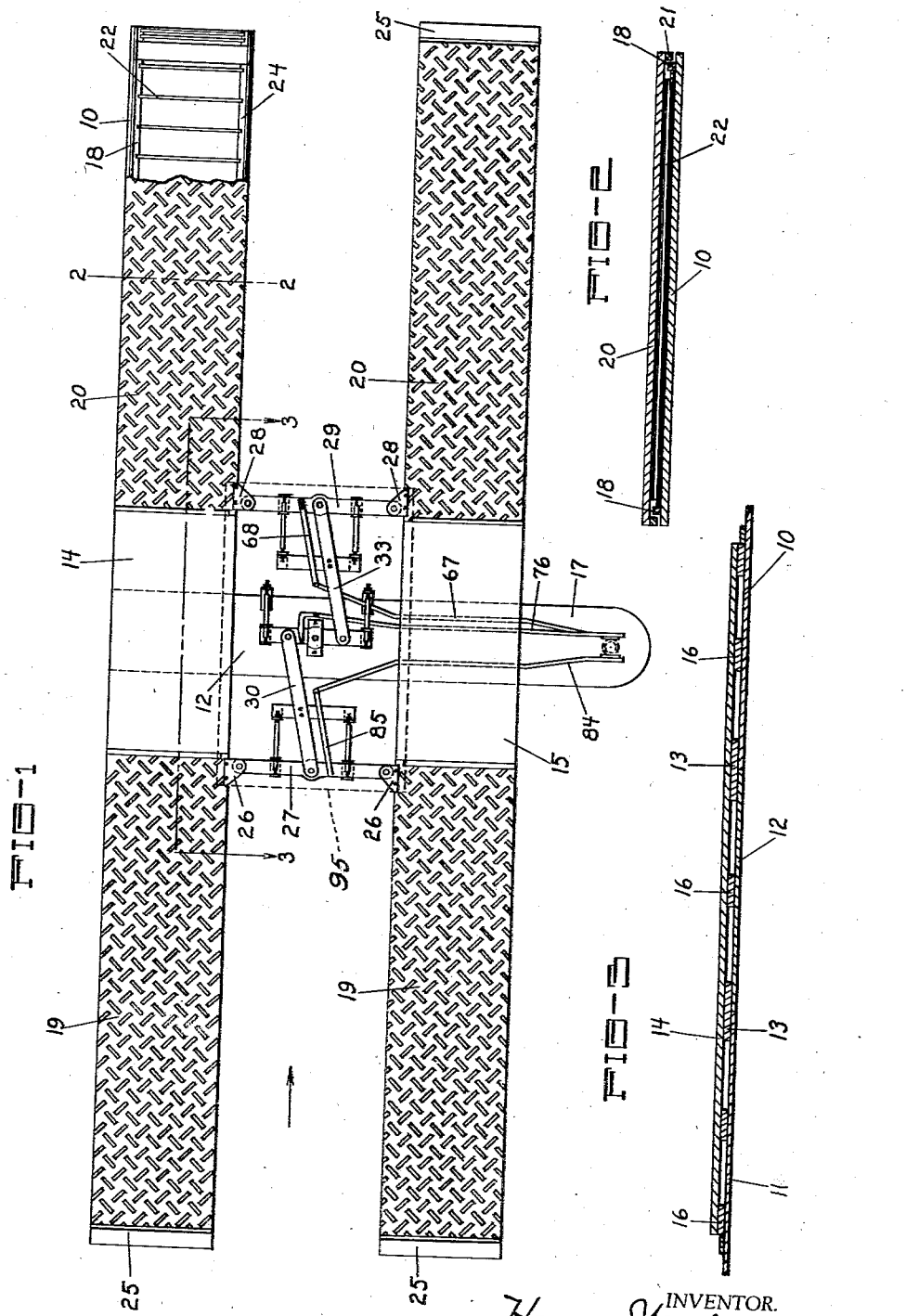

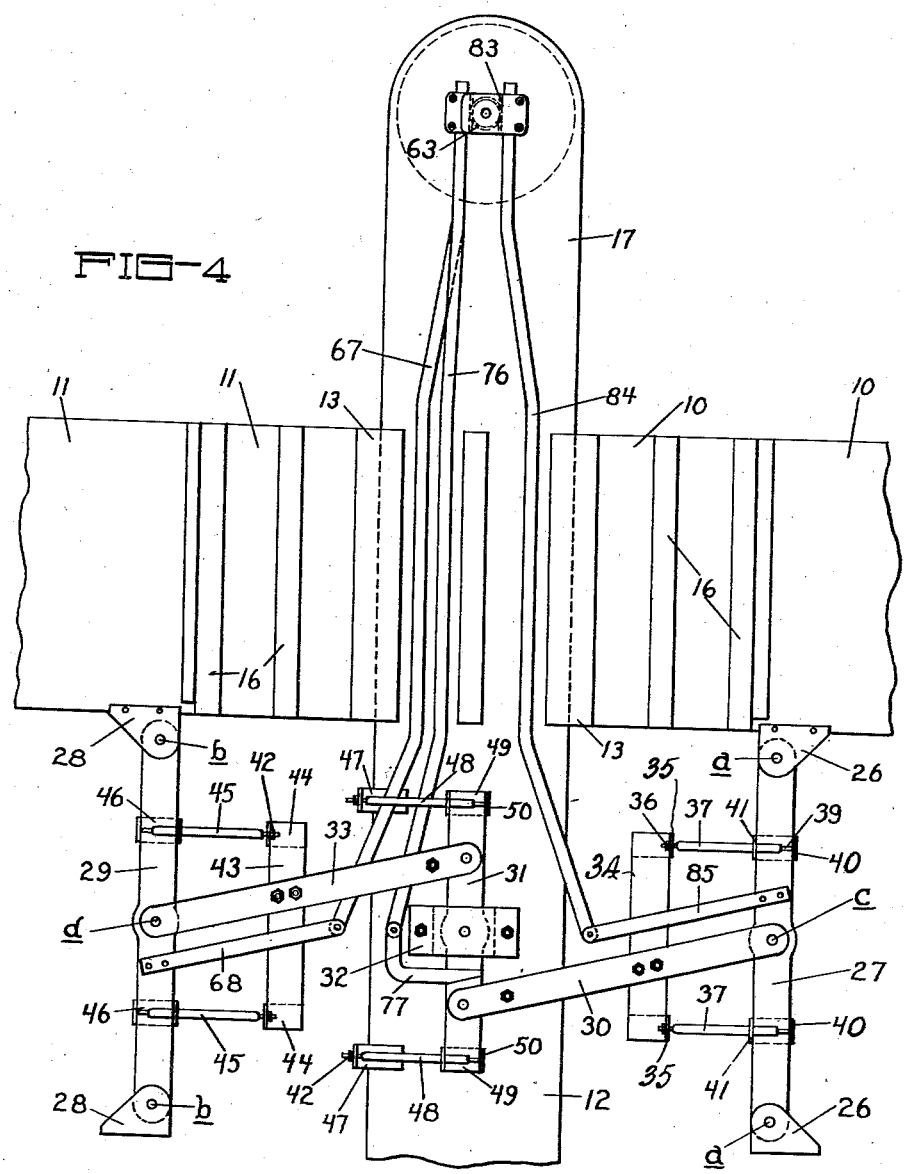

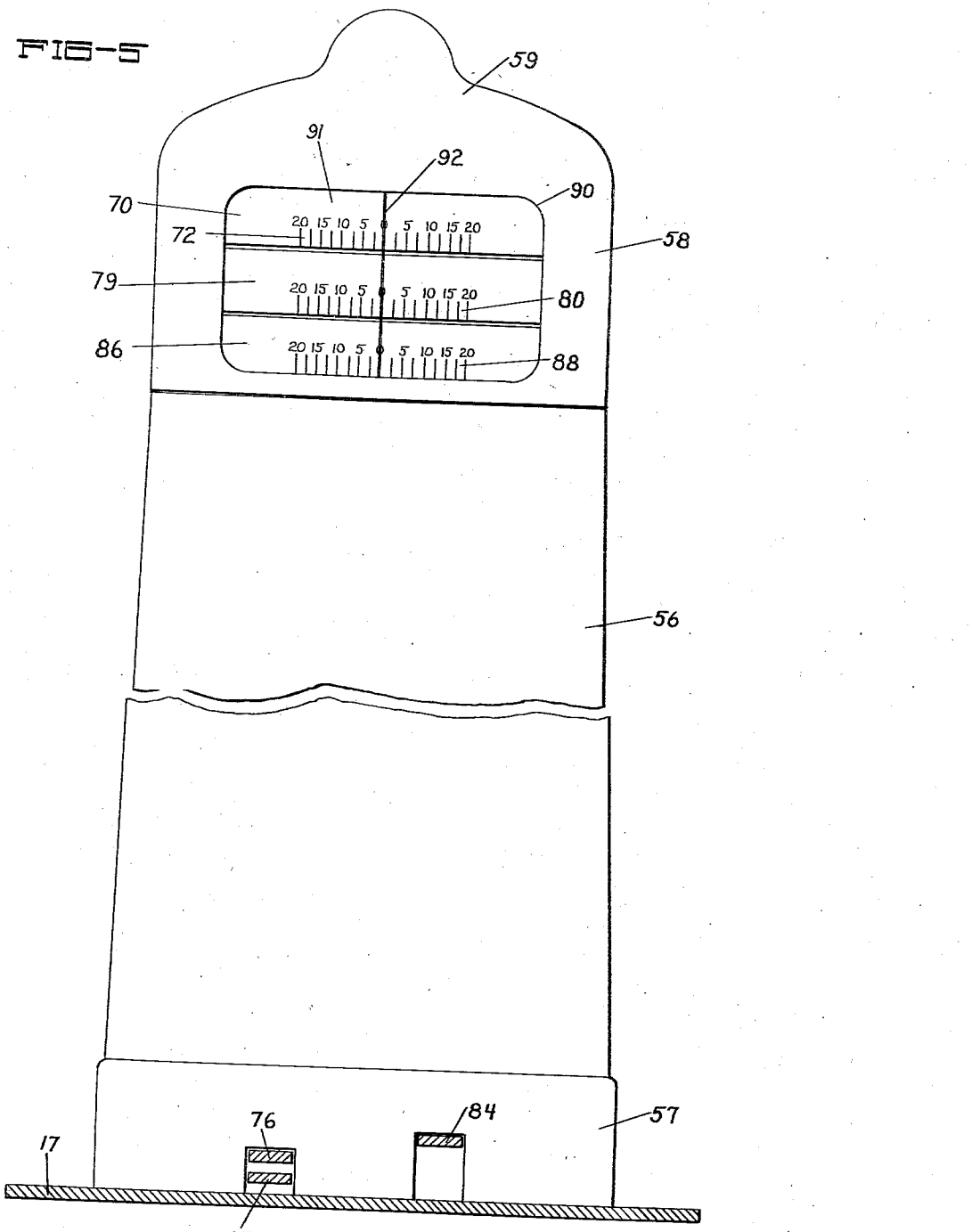

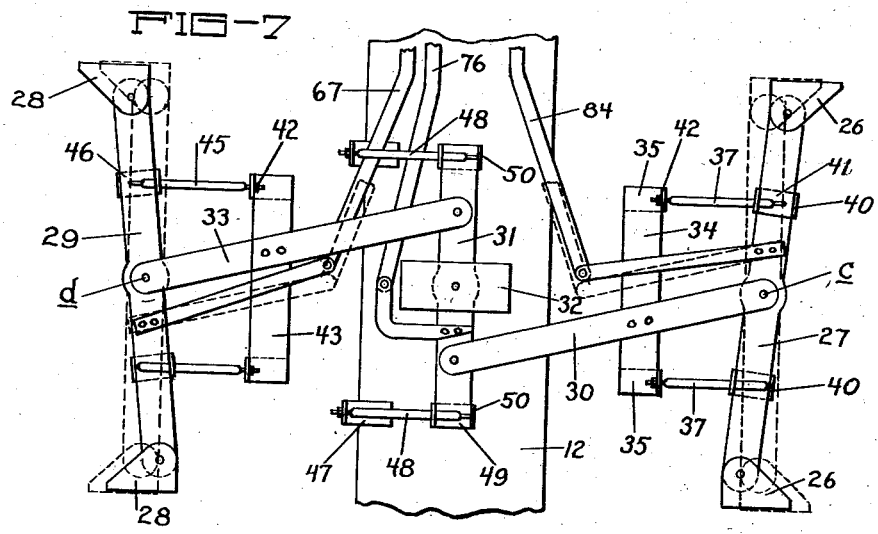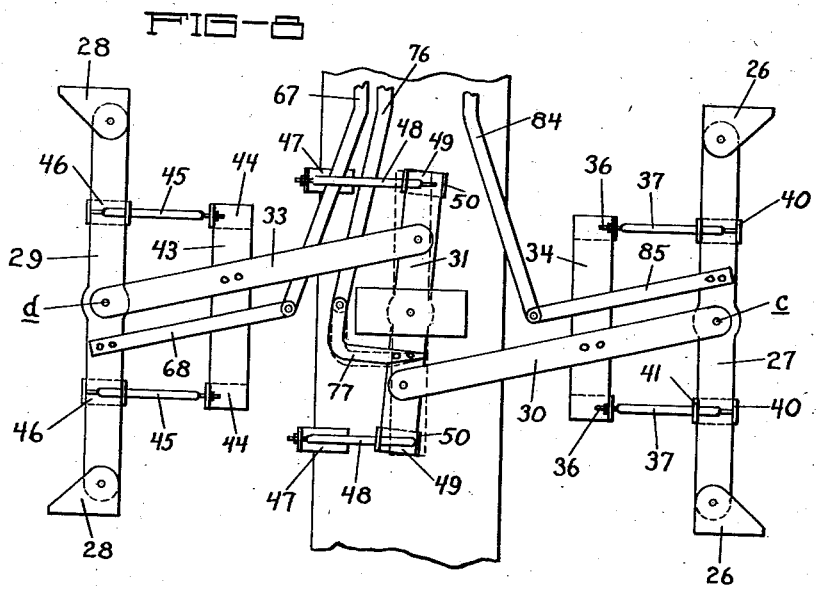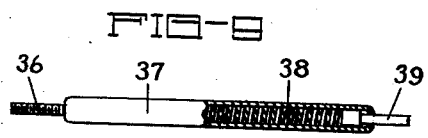

Patented Aug. 29, 1939

2,171,283

UNITED STATES PATENT OFFICE 2,171,283

BRAKE TESTING APPARATUS FOR MOTOR VEHICLES

Henry Wochner, Rock Island, Ill., assignor to Bear Manufacturing Company, Rock Island, Ill.

Application August 12, 1936, Serial No. 95,543

6 Claims. (Cl. 73—51)

My invention has reference to a brake testing apparatus for automobiles, and has for its chief purpose to produce a mechanism of the kind named of great simplicity and durability, and which will not be liable to get out of order.

Machines of the type mentioned which have been disclosed in the prior art have usually comprised three principal mechanisms, to wit;—a tread-plate or plates to receive the wheels of a vehicle, and support the same while a braking stress is being placed thereon;—an indicating apparatus for showing the degree of variation of a brake action from normal,—and means for imparting to the gauge devices the amount of movement of the tread-plates, if any, in response to the braking action. In a number of said former machines the indicating means has consisted of transparent gauges of a common type, containing a liquid indicating medium, and in which a hydraulic or liquid conducting force was relied upon to receive the force of the brake resistance and impart it to the indicators. These machines are mostly clumsy and complicated, with a separate gauge for each of the wheel brakes, and independent means for actuating said gauges, which indicate the variation in pressure of each brake, and in some cases the total amount of such variation.

One of the purposes of the present invention is to provide a structure of mechanical parts throughout, and of a limited number, by means of which the percentage of variation in the resistance of the brakes on a pair of vehicle wheels may be determined, such wheels being either the front pair or back pair, and the arrangement being such that a reading of both front and rear pairs of wheels may be taken at the same time.

Another purpose of the invention is to provide a means for taking a reading of the brakes of the four wheels jointly, so as to show the relative amount of resistance as between the front pair of wheels and rear pair of wheels. This is also done by means of indicating means showing the percentage of variation between the two pairs.

The above named, and other features and advantages of the invention will be more fully understood by the following specification, taken in connection with the accompanying drawings, in which—

Fig. 1 is a plan view of the invention, with a part broken away, and the indicating apparatus omitted.

Fig. 2 is a cross-section on the broken line 2—2 of Fig. 1.

Fig. 3 is a section on the broken line 3—3 of Fig. 1.

Fig. 4 is an enlarged view of the actuating devices, in an inactive position.

Fig. 5 is an elevation of the indicator tower, 5 from the inner or machine side thereof, and enlarged.

Fig. 6 is a vertical medial section of said tower.

Figs. 7 and 8 are diagrammatical illustrations showing the manner of operation of the actuating mechanism.

Fig. 9 is a detail of one of the spring units 37, partly in section.

The base of the machine comprises two pairs of ground-plates 10 and 11, to be positioned on the floor of a garage or other suitable place. The inner ends of said plates abut the edges of a cross-plate 12, and are connected therewith by means of splicing plates 13, which are bolted thereto, and also with a pair of intermediate plates 14 and 15. The plates 14 and 15 are spaced from the plate 12 by said plates 13, and by additional plates 16. At one of its ends the plate 12 is provided with an extension 17, for the support of an indicating apparatus, such as will be hereinafter more fully set forth.

Secured on the upper faces of the plates 10 and 11 near the edges thereof are longitudinal ribs 18, supported above which are pairs of tread-plates 19 and 20, provided on their edges with downwardly turned flanges 21 which permit a movement of the tread-plates length-ways of the machine, but prevent lateral movement thereof. Said flanges also provide closures for the sides of the spaces between the ground-plates and tread-plates. There is a sufficient space between the ends of the plates 14 and 15 and the inner ends of the tread-plates 19 and 20 to permit a limited inward movement of said tread-plates, and at the outer ends of said tread-plates is a similar clearance with the aprons 25.

Anti-friction means is provided between the ground-plates and tread-plates, consisting of small rollers 22, arranged at intervals between said plates, the ends of said rollers being held rotatably in recesses in plates 24, secured on the inner sides of the ribs 18. Small aprons 25 are also secured to the ends of the ground-plates, with an incline upwardly toward the tread-plates, to assist in running the wheels of a vehicle thereon. The frame pieces are formed of thin flat plates, and, together with the tread-plates, require but little space above the floor, the total thickness thereof being less than an inch.

Fixed to the inner corners of the tread-plates 19 are brackets 26, with which are pivotally connected the ends of an equalizer bar 27, as at $a$, and the inner corners of the tread-plates 20 are similarly provided with brackets 28, with which the ends of an equalizer bar 29 are pivotally connected, as at $b$. One end of an arm 30 is pivoted to the bar 27 at a point $c$ midway the ends of said bar, the other end of said arm having a pivotal connection with an equalizer bar 31, pivoted centrally on a plate 32 fixed on the upper face of the plate 12, the connection of said arm being at one side of the pivot of the bar 31. One end of a similar arm 33 is pivoted at $d$ to the bar 29, the other end thereof having a pivotal connection with the equalizer bar 31 on the opposite side thereof to the arm 30.

Fixed to the arm 30 is a cross-bar 34, provided at its ends with angle-plates 35, perforated to receive pins 36 having a threaded connection with one end of cylinders 37, containing coiled springs 38 against one of the ends of which the pins 36 bear. Bearing against the outer ends of said springs are pins 39, slidable in said cylinders, and in contact at their outer ends with ears 40 on clips 41 secured to the equalizer bar 27. The inner ends of said pins bear against the ends of the springs 38. The cylinders 37 are slidable in openings in said clips, and the springs therein possess sufficient initial force to hold the equalizer bar 27 and tread-plates 19 normally in the position shown in Fig. 1, with said plates in position to receive a pair of wheels for brake testing purposes. The pins 36 are provided with nuts 42, capable of holding said pins 36 in adjusted positions to increase or diminish the force of the springs 37.

Fixed to the arm 33 is a similar cross-bar 43, provided at its ends with plates 44, connected with which are spring units 45, of similar construction to those above described, and having a sliding engagement with clips 46 on the bar 29. By this means the equalizer bar 29 and plates 20 are held yieldingly in position, as shown in Fig. 1, and are returned to such position after being disturbed.

The central equalizer bar 31 is held normally in a neutral position, as shown in Fig. 4, by means of spring devices similar to those hereinbefore described, as follows:—Attached to one edge of the plate 12 are angle-plates 47, connected with which are spring units 48, slidable in clips 49 on the ends of the bar 31, and having spring compression pins in contact with ears 50 on said clips.

Only one of each pair of spring units operates at one time. As shown in Fig. 7 the movement of the equalizer bar 27 compresses the spring in the lower cylinder 37, while the upper cylinder 37 slides in the clip 41, with the actuating pin out of contact with the ear 40. When the equalizer bar 27 is rocked in the opposite direction the action of the springs is reversed. By adjustment of the pins 36, and similar pins in the other units, the tension of the springs can be increased or diminished, as desired.

Mounted on the end of the extension 17 is an indicator casing or tower 56, (Figs. 5 and 6,) which includes a base 57 and head 58, surmounted by a cap 59. Centrally of said tower is a vertical shaft 60, of tubular formation, the lower end of which is supported on a plate 61 secured on the plate 17, and which shaft is rotatable in a second hollow shaft 62, which in turn is rotatable in a third hollow shaft 63, journaled in bearings 64 connected with the tower 56. Fixed to the lower end of the shaft 60 is a pinion 65, in a housing 66, in which housing is also slidable the outer end of a bar 67, the other end of which is pivoted to one end of an arm 68, fixed at its other end to the equalizer bar 29. The housing 66 provides a support for the lower end of the shaft 62. The outer end of the bar 67 is provided with a rack 69, the teeth of which are engageable with the teeth of the pinion 65. A movement of the equalizer bar 29 upon its pivot will be imparted to the shaft 60, to give a partial rotation thereto. The degree of movement of said shaft is disclosed by means of a hollow disk 70, secured to the upper end of the shaft 60 by a connection 71. The disk is preferably of Celluloid or similar material, and is provided on its outer wall with a scale 72, of double form, with graduations extending from a central point in each direction.

Above the housing 66 is a similar housing 74, containing a gear pinion 75 fixed to the lower end of the shaft 62, with which is engaged a rack on the end of a bar 76, slidable in the housing 74, and having a pivotal connection at its inner end with an angle-arm 77 fixed to the cross-bar 31. The housing 74 provides a support for the lower end of the shaft 63. A movement of said cross-bar, under conditions hereinafter set forth, will cause a reciprocation of the bar 76, and consequent turning of the pinion 75 and shaft 62. Fixed to the upper end of the shaft 62 by a connecting block 78 is a disk 79, similar to the disk 70, and provided with a corresponding gauge 80, of dual form, with markings similar to those on the first-named disk.

Above the housing 74 is a similar housing 81, within which a toothed pinion 82 is secured to the lower end of the shaft 63, for operation by the teeth of a rack 83 on the end of a bar 84, slidable at its outer end in the housing 81. The inner end of the bar 84 is pivoted to the end of an arm 85 fixed to the equalizer bar 27. A rocking movement of said bar on its pivot is thereby communicated to the shaft 63, to give a partial rotation thereto in one direction or the other. Such movement may be indicated by a disk 86 attached to the upper end of the shaft 63 by a connection 87, upon which disk are the dual markings of a gauge 88, similar in arrangement to the disks hereinbefore set forth.

On the side toward the machine the head 58 of the tower has an opening 90, containing a transparency 91, with a vertical hairline mark 92 for use with the gauges hereinbefore described, the neutral or zero point of each of said gauges being normally in line with the mark 92. If desired, the head 58 can be in the form of a glass cylinder, as indicated in Fig. 6, with a suitable mark on the glass for use with said gauges. The height of the gauges above the ground is such as to make the same easily readable by the driver of an automobile.

The central mechanical bars and levers may be covered if desired by a guard plate, as indicated in broken lines at 95 in Fig. 1, and the bars 67, 76, and 84 are carried outwardly in the spaces between the plates 15 and 12.

The tread-plates are preferably roughened on their upper surfaces in the usual manner, to insure a prompt and positive engagement of the wheels of a vehicle therewith, and when it is desired to test such wheels, the vehicle is driven upon the machine until all four of the wheels are upon the tread-plates, and then the brakes are suddenly set. If the braking force of a pair of wheels resting upon the plates 19 is identical there will be no movement of such plates relative to each other, nor of the equalizer bar 27 connecting the same, but if there is a greater frictional or gripping force applied to one of such wheels over the other of such pair, it will predominate over the other one, and cause a movement of a tread-plate upon which it rests in the direction in which it is moving. At the same time the other wheel and tread-plate upon which it rests will move in an opposite direction, being impelled thereto by the rocking movement of the equalizer bar upon its pivot, as indicated in Fig. 7. In their normal positions the center lines of the equalizer bars 27 and 29 are parallel with each other, and with the center line of the plate 12, but as shown in said Fig. 7 the equalizer bar 29 has been rocked into a position out of normal, as by the force of a right hand wheel moving in the direction of the arrow. The degree of movement of the equalizer bar will be greater or less, depending upon the relative force exerted by the pair of wheels, and the combined effect thereof upon the bar. This force is exerted against the spring apparatus connected with said bar, and stores additional power in one or other of the spring units, to assist in returning the parts to a point of rest.

In case the wheel which receives and imparts the greater amount of impetus is on the right, as suggested, the movement of the equalizer bar 29, as shown in Fig. 7 will effect a movement of the bar 67, in a direction to turn the disk 70 and gauge 72 thereon, to the left, as shown in Fig. 5, and indicate the degree of such movement on the right hand scale of said gauge. In the same manner, if the wheel which has the prevailing amount of force is the one on the left side the equalizer bar 29 will be rocked in the opposite direction, and the indication will be on the left side of the scale. The same is true of the equalizer bar 27, except that the indications are on the disk 86, and the movement thereof is effected through the bar 84. By the use of the two bars, a test of the brakes on both pairs of wheels can be made at the same time, and indicated coincidently on the disks 70 and 86. The mechanisms are also of a reversible character, so that cars can be driven onto the machine from either direction, and the tests can be made while the vehicle is moving in either direction.

The bars 27 and 29, together with the central bar 31, with their connections, comprise a multiple equalizing system, whereby it is possible to determine the relative action of the front wheels as opposed to the rear pair, in case there is any diversion therein. When this is the case, it results in a movement of the equalizer bar 31, as shown in Fig. 8, wherein the normal position of said bar is noted in broken lines. If rocked in the position shown, the effect is a movement of the bar 76 in a direction to cause a rotation of the shaft 62 in a direction to turn the disk 79 and gauge 80 to the left, (Fig. 5) indicating the amount and location of the fault. If the equalizer bar 31 is rocked in an opposite direction, the disk and gauge are moved toward the right.

The purpose of each of the indicating devices is to disclose the percentage of the fault, if any, from a perfect or one hundred per cent condition, and make it possible to correct such fault. A limited number of markings is required on the scale, as beyond a certain percentage there would be a complete slippage of the brakes, and the vehicle would be likely to run on the machine at one end and off at the other end.

As hereinbefore stated, the present invention is of simple construction and operation, and of a durable character. Applicant does not wish to be understood to be limited to the exact construction and arrangement set out herein, as changes can be made therein without departing from the general scope of the invention, as described and claimed herein.

What I claim, and desire to secure, is:

1. A brake testing apparatus, comprising a ground frame, two pairs of tread-plates supported for movement on said ground-frame, adapted to receive the front and rear wheels of a motor vehicle simultaneously and respond to the action of the brakes applied to said wheels, an equalizing system uniting said tread-plates, including equalizing bars uniting said pairs of tread-plates and an equalizing bar operatively connected with said first-named bars, means for holding said tread-plates and equalizing system yieldably in inactive position and returning the same thereto after being actuated, indicating means connected with said first-named bars, and indicating means connected with said last-named bar, to show the relative action of the two pairs of wheels.

2. A brake testing apparatus comprising a ground-frame, a pair of tread-plates mounted thereon and adapted to receive a pair of vehicle wheels and respond to the braking action thereof, an equalizing device uniting said tread-plates, a pair of springs connected with said equalizing device and holding the same initially in inactive position, one or other of said springs being compressible by the movement of said device, and non-active when the other spring is in effect, and means for indicating the relative action of said tread-plates.

3. A brake-testing machine, comprising a pair of ground-plates, a pair of tread-plates supported thereon for limited movement, an equalizing device uniting said tread-plates, a tower supported adjacent to said plates, and provided in its head with an indicating means, a vertical shaft in said tower, a disk on the upper end of said shaft, a scale on said disk, readable with said indicating means, and means for imparting the movement of said equalizing device to said shaft to give rotation thereto.

4. A brake-testing apparatus comprising a ground-frame, two pairs of tread-plates supported on said ground-frame and adapted to receive the wheels of an automobile and respond to the braking action thereon, an equalizer bar uniting each of said pairs of tread-plates, an indicating device including a pair of concentric vertical shafts, an indicating device on each of said shafts, for indicating the movement of one or other of said bars in either direction, and means connecting said bars and shafts and adapted for simultaneous action thereof.

5. A brake-testing apparatus comprising a ground-frame, two pairs of tread-plates supported on said ground-frame, adapted to receive the wheels of an automobile and respond to the actions of the brakes thereon, an equalizing system including an equalizer bar uniting each pair of tread-plates, an equalizer bar operatively connected with said first-named bars, a triple hollow shaft supported adjacent to said ground-frame, indicating disks on the upper ends of said shafts, provided with scales with dual markings, means for imparting the movement of said first-named bars to two of said shafts, and connections between the last-named bar and the other of said shafts to actuate the same simultaneously with the operation of said first-named bars.

6. In a brake-testing apparatus, the combination of means for receiving the wheels of an automobile in position to respond to the braking impulse on said wheels, means for equalizing the relative movements of said wheels under said impulses, a plural concentric hollow shaft system operatively connected with said equalizing means with shafts independently rotatable, and indicating means connected with the shafts of said system for indicating the various percentages of movements of said wheels.

HENRY WOCHNER.